United States Patent [19]

Nolting et al.

[11] Patent Number: 4,832,431

[45] Date of Patent: May 23, 1989

[54] APPARATUS FOR CONTINUOUS POLARIZATION AND PHASE CONTROL

[75] Inventors: Hans-Peter Nolting; Helmut Heidrich; Detlef Hoffmann, all of Berlin, Fed. Rep. of Germany

[73] Assignee: Siemens Aktiengesellschaft, Berlin and Munich, Fed. Rep. of Germany

[21] Appl. No.: 95,240

[22] Filed: Sep. 11, 1987

[30] Foreign Application Priority Data

Aug. 18, 1986 [DE] Fed. Rep. of Germany ....... 3631798

[51] Int. Cl.$^4$ ............................................. G02B 6/10
[52] U.S. Cl. ................................ 350/96.14; 350/96.13
[58] Field of Search ............... 350/96.11, 96.12, 96.13, 350/96.14

[56] References Cited

U.S. PATENT DOCUMENTS

| 4,153,328 | 5/1979 | Wang | 350/96.11 |
|---|---|---|---|
| 4,220,395 | 9/1980 | Wang et al. | 350/96.12 |
| 4,384,760 | 5/1983 | Alferness | 350/96.14 |
| 4,415,226 | 11/1983 | Verber et al. | 350/96.14 |
| 4,533,207 | 8/1985 | Alferness | 350/96.14 |
| 4,613,204 | 9/1986 | Verber et al. | 350/96.14 |
| 4,732,444 | 3/1988 | Papuchon et al. | 350/96.14 |

FOREIGN PATENT DOCUMENTS

| 57-158616 | 9/1982 | Japan | 350/96.14 |
|---|---|---|---|
| 58-91425 | 5/1983 | Japan | 350/96.14 |
| 59-93430 | 5/1984 | Japan | 350/96.14 |

OTHER PUBLICATIONS

"Integrated-Optical Single-Sideband Modulator and Phase Shifter", IEEE Transactions on Microwave Theory and Techniques.

"Broadband Single-Mode TE/Tm Converters in LiNbO$_3$: A Novel Design", C. H. Helmolt, Electronics Letters of Jan. 30, 1986, vol. 22, Noe, p. 155.

Primary Examiner—William L. Sikes
Assistant Examiner—Frank González

[57] ABSTRACT

Apparatus for continuous reset-free polarization and phase control which includes an optical strip waveguide 10 in which two waves TE and TM mode are polarized orthogonally relative to each other and have mutually different propagation constants $\beta_1$ and $\beta_2$ and includes a plurality of N=4m equidistant electrodes ($E_i$, where i=1, 2 ... N) which are mounted successively along the strip waveguide 10 and where m is a whole number between 5 and 10 and wherein each electrode $E_i$ receives a voltage $$U_i = U_0 \sin(\eta + (i-1)\cdot\pi\cdot\Lambda_0/2\cdot\Lambda_1) \text{ with } i=1, 2, \ldots N$$

wherein $\Lambda_0$ is the geometrical length fixed by four electrodes and $\Lambda_1$ is the length defined by the operating wavelength $\Lambda_1$ and $\eta$ is a variable control quantity between and 0 and $2\pi$ and $U_0$ is a variable maximum voltage. A wavelength region spreading of one octave or more can be achieved with this arrangement and the arrangement can be utilized as a tunable filter having a very large tuning range or can be utilized as a wavelength/selective switch.

15 Claims, 1 Drawing Sheet

APPARATUS FOR CONTINUOUS POLARIZATION AND PHASE CONTROL

BACKGROUND OF THE INVENTION

1. Field of the Invention

The present invention relates to apparatus for continuous reset-free variable polarization and phase control in an optical waveguide and has a plurality of function locations divided into pass sections of equal length.

2. Description of the Prior Art

The article by U. Heismann, R. Ulrich entitled "Integrated-Optical Single-Sideband Modulator and Phase Shifter", occurring in the IEEE transactions on Microwave and Technique, mTT-30 (1982), pages 613–617 discloses a known arrangement where the waveguide is composed of a strip waveguide indiffused in the surface of a lithium niobate crystal cut in the x-direction and the strip waveguide extends in the y-direction and perpendicular to the z-axis or optical crystal axis of the birefringent crystal. As a result, the TE mode and the TM mode have propagation constants $\beta_1$ and $\beta_2$, respectively, in the waveguide which are different from each other and which are, moreover, maximally different from each other due to such crystal material and such crystal cut.

With this arrangement, a pair of functional control locations is located in every length segment of the fixed period lengths whereby the spacing between the two functional element locations is smaller than the spacing between adjacent locations of functional pairs.

The fixed period length can be equal to the beat wavelength between the TE mode and the TM mode at the wavelength determined by the crystal material or can be an integer multiple thereof. In the disclosed embodiments, the period length is selected to be three times as large. Two coupling factors are alternately appointed to the successive functional locations with the one of these two coupling factors being proportional to sin $\eta$, the other being being proportional to cos $\eta = \sin(\eta + \pi/2)$.

In the embodiments according to the invention, the location of the functional elements are defined by comblike interengaging electrode structures which are arranged above the waveguide on the substrate.

The known arrangement utilizes both the intrinsic birefringence as well as electro-optically induced birefringence having a small angle relative to the intrinsic birefringence refraction. The reset-free or continuous operation of the polarization conversion between the TE mode and TM mode with continuous polarization drift is achieved by application of the principle of the two-phase synchronous motor to integrated optics.

The wavelength $\lambda_0$ of 0.6 $\mu$m or 1.3 $\mu$m determined by the crystal material causes extremely short beat wavelengths of 7 $\mu$m or, respectively, 16 $\mu$m and thus causes extremely short period lengths. For a complete polarization conversion between the modes polarized orthogonally relative to each other, the extremely short period length requires a large number of periods, i.e. line sections for this length. This results in an extremely narrow bandwidth arrangement in which the bandwidth is smaller tha 2 nm.

The article by C. H. von Helmolt, entitled "Broadband Single-Mode TE/TM Converters in LiNbO$_3$: A Novel Design", occurring in Electron. Letters 22 (1986) at page 155, describes a TE to Tm converter wherein a strip waveguide at the surface of a lithium niobate crystal cut in the y-direction extends at an angle of $\theta < 90°$ relative to the x-axis of the crystal. Equidistantly spaced electrodes are arranged along the strip waveguide which are alternately supplied with positive and negative voltages. The sequence of the electrodes is divided into line sections of a fixed period length such that two electrodes are located in every line section.

As compared to a corresponding converter wherein the strip waveguide extends parallel to the x-axis and thus perpendicular to the crystal axis or z-axis of the crystal, this converter has a larger bandwidth. With an angle of $\theta = 80°$, for example, a relative bandwidth of $(\lambda - \lambda_0)/\lambda_0$ of 3.2% is achieved at the prescribed wavelength of $\lambda_0 = 1.3$ $\mu$m. Twenty-two line sections of the fixed period length are thus required for a complete polarization conversion. The fixed period length is about 0.55 mm and, thus, is 423 times the prescribed wavelength $\lambda_0$.

SUMMARY OF THE INVENTION

The present invention relates to reset-free polarization in phase control in an optical waveguide wherein the propagation constants of an optical wave propagating in a defined direction and the propagation constant of an optical wave propagating in the same direction and polarized orthogonally relative to the other wave differ from each other at a prescribed wavelength $\lambda_0$ and including a plurality of defined function locations which are arranged in the defined direction along a distance S and are divided into path sections $A_k$ of equal period lengths L and arranged at distances following one another wherein the same plurality of N locations $F_i$ for modifying the polarization condition and the phase are located in each of the m path sections and where the fixed period length L is equal to or is an integer multiple of the beat length $\Lambda_0$ of the two waves i.e., TE and TM modes, and the state of polarization and phase of the two waves (TE and TM mode) are tunable at each location for modifying the polarization and phase, and the amount of tuning of the polarization and phase is defined by variable coupling factors individually allocated to each location, and the coupling factor is defined by $\chi_i = \chi_0 \sin(\eta + \alpha(i))$ with $i = 1,2 \ldots N$ and $\chi_0$ denotes a variable maximum value of the coupling factors $\chi_i$, $\eta$ is a control variable tunable at least in the range from 0 through $2\pi$ and (i) is an integer to identify the individual electrodes of each location $F_i$.

In the solution according to the invention, an increased bandwidth is achieved by a number of features which assures a small m. The usable wavelength region is greatly improved in that a geometrically fixed electrode structure defining the location of the arrangement whose fixed period length $L = j \cdot \Lambda_0$ with $j = 1, 2, 3, \ldots$, prescribes the wavelength $\lambda_0$ matched to the operating wavelength $\lambda_1$ in electrically variable fashion. An increasing of the wavelength region of at least one octave, in other words $\Delta\beta(\lambda_0)/4 \leq \Delta\beta(\lambda_1)/2 \leq \Delta\beta(\lambda_0)$ can thus be obtained without changing the characteristic. As compared thereto, the 3-dB bandwidth in the case of the fixed period length, in other words, without electrical matching to the operating wavelength amounts only to $\Delta_{HWB}/\Delta\beta(\lambda_0) = 1/m$.

As in the article by U. Heismann and R. Ulrich, a variation of control variable $\eta$ in the arrangement of the invention results in a phase shift which is unlimited and variation of the maximum of $\chi_0$ results in a polarization rotation. The arrangement of the invention also utilizes the fact that a phase skip occuring in pure TE or TM polarization is possible without affecting the following optical circuit.

The arrangement of the invention provides an arrangement having an electrically tunable period length which is preferably suitable for compensating manufacturing tolerances which occur in the manufacturing process and are unavoidable.

The arrangement of the invention can be formed as a uniform device for performing both the transformation of the polarization angle as well as the phase angle from any arbitrary starting condition into arbitrary final conditions.

Since m is small in the arrangement of the invention, the linearized theory described in the article by U. Heismann and R. Ulrich for extremely large m do not apply and recourse is had to the exact equations in the coupled mode theory for describing a polarization converter and in particular, the degree of nonlinearity of the characteristics of the component had to be identified for m approaching 1. Monotonically rising or falling characteristics without overshoot are therefore necessary for control of the arrangement of the invention. An analysis shows that the polarization and phase angles for $m > 2$ or 3 are an unambiguous function of the variables $\chi_0$ and $\eta$. So as to achieve an adequately straight function it is recommended that m be selected to be equal to $5 \leq m \leq 10$ thereof and it is expedient to select at least the two-hundred-fold through seven-hundred fold multiple of the prescribed wavelength $\lambda_0$ for the preferred period length $L = \Lambda_0$.

An absolute value of a difference $\Delta\beta$ between the propagation constants $\beta_1$ and $\beta_2$ of the two waves which are polarized orthogonally which is a small amount can be achieved by using a small intrinsic birefringence.

For compensating unavoidable manufacturing tolerances, it is expedient to provide an electro-optically induced birefringence which is generated by means of which the deviations from the desired intrinsic birefringence can be settled or the desired birefringence can be adjusted.

The locations for modifying the polarization and phase of the arrangement of the invention can be defined by individual electrode arrangements that are generally dependent on the material. For realizing the arrangement of the invention suitable individual electrodes can be appointed to each function location, with regard to lithium niobate and for other materials the equation $\chi_i$ is proportional to $U_i$ and $\chi_{a_i}$ is proportional to $U_0$ such that a variation of $U_0$ results in a polarization change. As compared to an arrangement which comprises only $N = 2$ function locations instead of $N = 4$ function locations, but which is moreover constructed identically and whose defining electrodes must be supplied with voltage values of $+U_a$ and $-U_a$ which successively alternate to achieve a complete polarization conversion, $U_0$ in the invention as defined by the a.m. equation must be selected to be greater than $U_a$, i.e. as $U_0 = \sqrt{2} \cdot U_a$, so as to achieve the complete polarization conversion.

An optical buffer layer PS may be provided between the waveguide and an individual electrode $E_i$ so that the influencing of a mode by an electrode applied directly to the waveguide is avoided.

The invention includes a strip waveguide composed of a doped strip in a substrate of lithium niobate or it may comprise a strip waveguide formed as a rib waveguide on quaternary material and the quaternary material may be InGaAsP/InP. Wavelengths of 0.6 μm or 1.3 μm are employed for lithium niobate and the wavelength for InGaAsP/InP is more than 1 μm. The use of rib waveguides or RWGs on quaternary layers results depending on the material to greater period lengths $L = \lambda_0$ on the order of magnitude of $L = 300$ μm through 700 μm with increased bandwidths due to the orientation of the RWG relative to the optical crystal axes in such materials. See for example, German published application 36 00 548.

In an arrangement of the invention, the function locations are preferably arranged equidistant from each other.

The invention can be used as a tunable filter having an extremely large tuning range or it can be employed as a wavelength selective switch.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
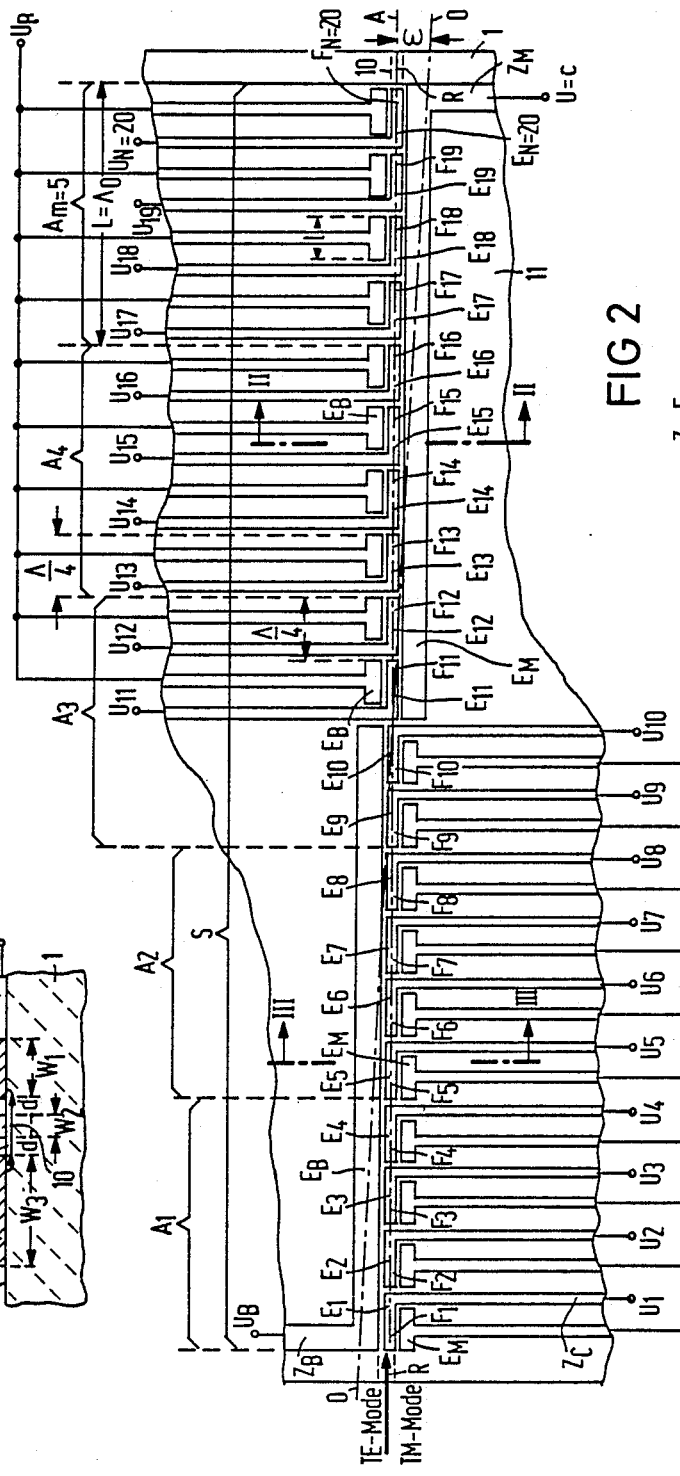
FIG. 1 is a plan view of the exemplary embodiment of the invention for continuous reset-free polarization and phase control defined for convenience as POLTRA.
Figure 2:
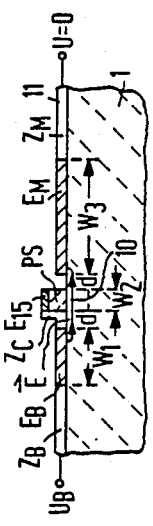
FIG. 2 is a cross-section along II—II from FIG. 1.
Figure 3:
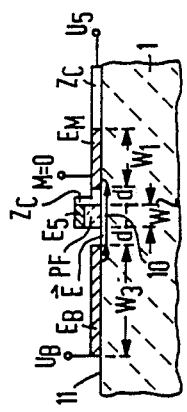
FIG. 3 is a cross-section along line III—III from FIG. 1.

In a POLTRA illustrated in FIGS. 1, 2 and 3, a substrate 1 is composed of lithium niobate and the strip waveguide 10 is comprised of a waveguide indiffused in the surface 11 of the substrate. The longitudinal axis A of the strip waveguide 10 extends at an extremely small angle $\epsilon$ relative to the optical crystal axis 0 of the birefringent substrate 1.

Individual electrodes are arranged above this strip waveguide 10 at a distance of $S = N = 20$ subdivided into $m = 5$ path sections of identical period length $L = \Lambda_0$ and the individual electrodes are referenced $E_1$ through $E_{N=20}$ in the defined direction R from left to right in FIG. 1. The individual electrodes $E_1$ through $E_{N=20}$ are arranged equidistant and their lengths in the direction of the waveguide 10 is selected to be as short as to that, respectively, $n = 4$ individual electrodes form a path section $A_1$ through $A_{m=5}$. The distance between the centers of two individual electrodes thus is $L/4$.

A selected voltage $U_i$ can be applied to every individual electrode $E_1$ by way of associated leads $Z_c$ and this voltage $U_i$ is defined by the following equation.

$$U_i = U_0 \sin(\eta + (i-1) \cdot \pi \Lambda_0 / 2^{\Lambda_1}) \text{ with } i = 1, 2, \ldots, N$$

In this manner, the individual electrodes $E_1$ through $E_{N=20}$ define the functional locations $F_1$ through $F_{N=20}$ of the POLTRA.

The individual electrodes $E_1$ through $E_{N=20}$ are not directly applied to the surface 11 of the substrate but are applied above an intervening electrically insulating optical buffer layer PS which serves to provide an undisturbed mode guidance in the waveguide 10. Longitudinal electrodes $E_B$ and $E_M$ are mounted on both longitudinal sides of the strip waveguide 10 and extend for the entire full length of the distance S and these can be directly applied to the surface 11 of the substrate 1. Electrical voltage difference $U_B$ can be applied with the electrodes $E_B$ and $E_M$ and an electrical field E will be generated which has field lines that penetrate the strip waveguide 10 over the entire distance S in a direction which is perpendicular to the longitudinal axis A of the waveguide 10 and penetrate it from one longitudinal side to the other. For example, the electrodes $E_B$ at the left-hand longitudinal side of the strip waveguide 10 relative to the defined direction R are used for applying a voltage $U_B$ and the electrodes $E_M$ arranged at the right-hand longitudinal side are connected to ground.

The leads $Z_c$ connected to the individual electrodes $E_1$ through $E_{N=20}$ interrupt the electrodes $E_B$ and $E_M$ in the region of the leads $Z_c$. A lead $Z_B$ or, respectively, $Z_M$ are also connected to each electrode $E_B$ and $E_M$ by which the proper voltage $U_B$ or respectively $U_0$ are applied to the associated electrode.

For a better distribution of the contacts required for applying the voltages, the contacts are mounted on the surface of the substrate and the leads $Z_c$, $Z_B$ and $Z_M$ are arranged at one side of the strip waveguide 10 for one-half the distance S and are arranged on the other side in the other half of the distance S.

In a concrete exemplary embodiment, the strip waveguide 10 was composed of a Ti doped waveguide which is manufactured by using indiffusion with a gap-shaped diffusion mask having a gap width of 75 nm which is produced at 1040° C. and for a diffusion time of 6 hours and 25 minutes. The optical buffer layer comprises a 700 nm thick layer of ITO and the individual electrodes $E_1$ through $E_{n=20}$, $E_B$ and $E_M$ and the leads $Z_c$, $Z_B$ and $Z_M$ are formed of a 200 nm layer of gold.

The width $W_2$ of the individual electrodes is 7 μm and the distance d between an individual electrode $E_i$ and the neighbouring electrode $E_B$ or $E_M$ is 5 μm. The width $W_1$ of an electrode $E_B$ or, $E_M$ which is arranged between two leads is 20 μm and the width $W_3$ of an electrode $E_B$ or $E_M$ arranged outside of the leads is 100 μm. The length of each individual electrode $E_i$ is 1 mm without considering the width of the lead $Z_c$. The width of the leads in the distance between two neighbouring individual electrodes or between two neighboring electrodes $E_B$ or, respectively, $E_M$ in the region of the leads is less 100 μm.

Although the invention has been described with respect to preferred embodiments, it is not to be so limited as changes and modifications may be made therein which are within the full intended scope as defined by the appended claims.

We claim as our invention:

1. An arrangement for continuous operation which does not require that the polarization and phase control be reset, comprising an optical waveguide (10) in which the propagation constant $\beta_1$ of a first optical wave (TE or TM mode) propagating in a defined direction (R) and the propagation constant $\beta_2$ of a second optical wave (TM mode or, respectively, TE-mode) propagating in the direction (R) and polarized orthogonally relative to said first wave differ from each other at a prescribed wavelength $\lambda_0$, and comprising a plurality $N = n \times m$ of locations ($F_i$, $i=1,2,\ldots,N$) for modifying the polarization and phase, which are arranged in said direction (R) in a distance (S) which is divided into path sections ($A_k$, $k=1,2,\ldots,m$) of equal period lengths L, and are arranged at a distance following one another such that the same plurality N of locations ($F_i$) lie in each of the m sections ($A_k$) of the distance (S), whereby a fixed period length L is an integer multiple of a beat length $\Lambda_o$ of said waves at the prescribed wavelength $\lambda_o$, and whereby the polarization and the phase of said waves are tunable at each location ($F_i$) for modifying polarization and phase, whereby the amount of the tuning of the polarization and the phase is defined by variable coupling factors $\chi_i$ individually associated with each and every location ($F_i$) for modifying the polarization and phase, said coupling factor $\chi_i$ defined by:

$$\chi_i = \chi_o \sin(\eta + \alpha(i)) \text{ with } i=1,2,\ldots,N$$

where $\chi_o$ is a variable maximum value of the coupling factor $\chi_i$, $\eta$ is a control variable which is variable at least in the range from 0 through $2\pi$, and $\alpha(i)$ is a defined function dependent on the identifier i of the locations ($F_i$) for modifying the polarization and phase, characterized in that (a) a waveguide (10) is provided wherein a difference $\Delta\beta(\lambda)$ between the mutually different propagation constants $\beta_1$ and $\beta_2$ as well as the maximum value $\chi_o$ which are functions of the wavelength $\lambda$ are so small at the prescribed wavelength $\lambda_o$ that the beat length $\Lambda_o$ allocated to the wavelength $\lambda_o$ according to the relationship:

$$\Lambda_o = \pi/\sqrt{(\Delta\beta(\lambda_o)/2)^2 + (\chi_o(\lambda_o))^2}$$

is at least the hundred-fold multiple of the prescribed wavelength $\lambda_o$;

(b) n=4 locations for modifying polarization and phase which are located in every section ($A_k$) of the distance (S); and in that (c) $\alpha(i) = (i-1) \cdot \pi \cdot \Lambda_o / 2 \cdot \Lambda_1$ with $i=1,2,\ldots,N$ is selected whereby $\Lambda_1$ is a beat wavelength of said first and second optical waves which are polarized orthogonally relative to one another, said beat wavelength corresponding to an operating wavelength $\lambda_1$ according to the relationship:

$$\Lambda_1 = \pi/\sqrt{(\Delta\beta(\lambda_i/2)^2 + (\chi_o(\lambda_1))^2},$$

and said arrangement being operated at this operating wavelength $\lambda_1$ and wherein, $\Lambda_1$ is ordinarily unequal to the geometrically prescribed beat length $\Lambda_o$, which predetermines the prescribed wavelength $\lambda_o$, but can also be equal to $\Lambda_o$ whereby it is generally valid that $\Lambda_1 \neq \Lambda_o$ for $\lambda_1 \neq \lambda_o$.

2. An arrangement according to claim 1 wherein L equals $\Lambda_0$.

3. An arrangement according to claim 1 or 2, characterized in that the number m of path sections ($A_k$) comprising the fixed period length L varies between 5 and 10.

4. An arrangement according to claim 3, characterized in that the difference $\Delta\beta(\lambda_0)$ and the maximum value $\chi_0(\lambda_0)$ are selected to be so small that the beat length $\Lambda_0$ associated with the wavelength $\lambda_0$ is in the range of two hundred through three hundred times the prescribed wavelength $\lambda_0$.

5. An arrangement according to claim 1, characterized in that the optical waveguide (10) is composed of a strip waveguide integrated on a birefringent, electro-optical substrate (1), the longitudinal axis (A) of this strip waveguide deviating by a small angle ($\epsilon$) from the optical crystal axis (0) of the substrate (1) which is selected to be so small that the difference $\Delta\beta(\lambda_0)$ resulting from this deviation results in a period length L and the maximum value $\chi_0$ ($\lambda_0$).

6. An arrangement according to claim 4, characterized in that the optical waveguide (10) is composed of a waveguide integrated on an electro-optical substrate (1); and electrodes ($E_B$, $E_M$) are arranged on the substrate (1) over the full distance (S) on both sides of the longitudinal strip waveguide (10), said electrodes ($E_B$, $E_M$) producing an electrical field (E) due to an electrical voltage difference ($U_B$) which is applied thereto, the field lines of this electrical field penetrating the strip waveguide (10) over the entire distance (S) in a direction perpendicular to the longitudinal axis (A) of the strip waveguide (10) and penetrating it from one longitudinal side to the other.

7. An arrangement according to claim 4, characterized in that every location for modifying polarization and phase ($F_i$, i=1,2, ..., N) is respectively defined by at least one allocated, separate electrode ($E_i$, i=1,2, ... , N) arranged on or over the substrate (1) and over the waveguide (10), an electrical voltage ($U_i$) associated with the appertaining location for modifying polarization and phase ($F_i$) is applied to these separate electrodes, said electrical voltage $U_i$ being defined by the equation:

$$U_i = U_0 \sin(\eta + (i-1)\cdot\pi\cdot\Lambda_0/2\cdot\Lambda_1) \text{ with } i=1,2,\ldots,N$$

where $U_0$ is a variable maximum voltage which $U_i$ can assume.

8. An arrangement according to claim 7, characterized in that an optical buffer layer (PS) is provided between the waveguide (10) and a separate electrode ($E_i$) covering said waveguide (10).

9. An arrangement according to claim 5 characterized in that the strip waveguide (10) is composed of a doped strip in a substrate (1) of lithium niobate.

10. An arrangement according to claim 5 characterized in that the strip waveguide (10) is composed of a rib waveguide on quaternary material.

11. An arrangement according to claim 10, characterized in that the quaternary material is InGaAsP/InP.

12. An arrangement according to claim 1 characterized in that the function locations ($F_i$) are equidistantly arranged.

13. An arrangement according to claim 1 which can be used as a tunable filter with an extremely large tuning range.

14. An arrangement according to claim 1 which can be used as a wavelength/selective switch.

15. An arrangement according to claim 5, characterized in that every location for modifying polarization and phase ($F_i$, i=1,2, ..., N) is respectively defined by at least one allocated, separate electrode ($E_i$, i=1,2, ... , N) arranged on or over the substrate (1) and over the waveguide (10), an electrical voltage ($U_i$) associated with the appertaining location for modifying the polarization and phase ($F_i$) is applied to these separate electrodes, said electrical voltage $U_i$ being defined by the equation:

$$U_i = U_o \sin(\eta + (i-1)\cdot\pi\cdot\Lambda_0/2\cdot\Lambda_1) \text{ with } i=1,2,\ldots,N$$

where $U_o$ is a variable maximum voltage which $U_i$ can assume.

* * * * *